Sept. 21, 1926.
B. E. AHLSKOG
1,600,383
GRAIN UNLOADING APPARATUS
Filed March 12, 1923      5 Sheets-Sheet 1
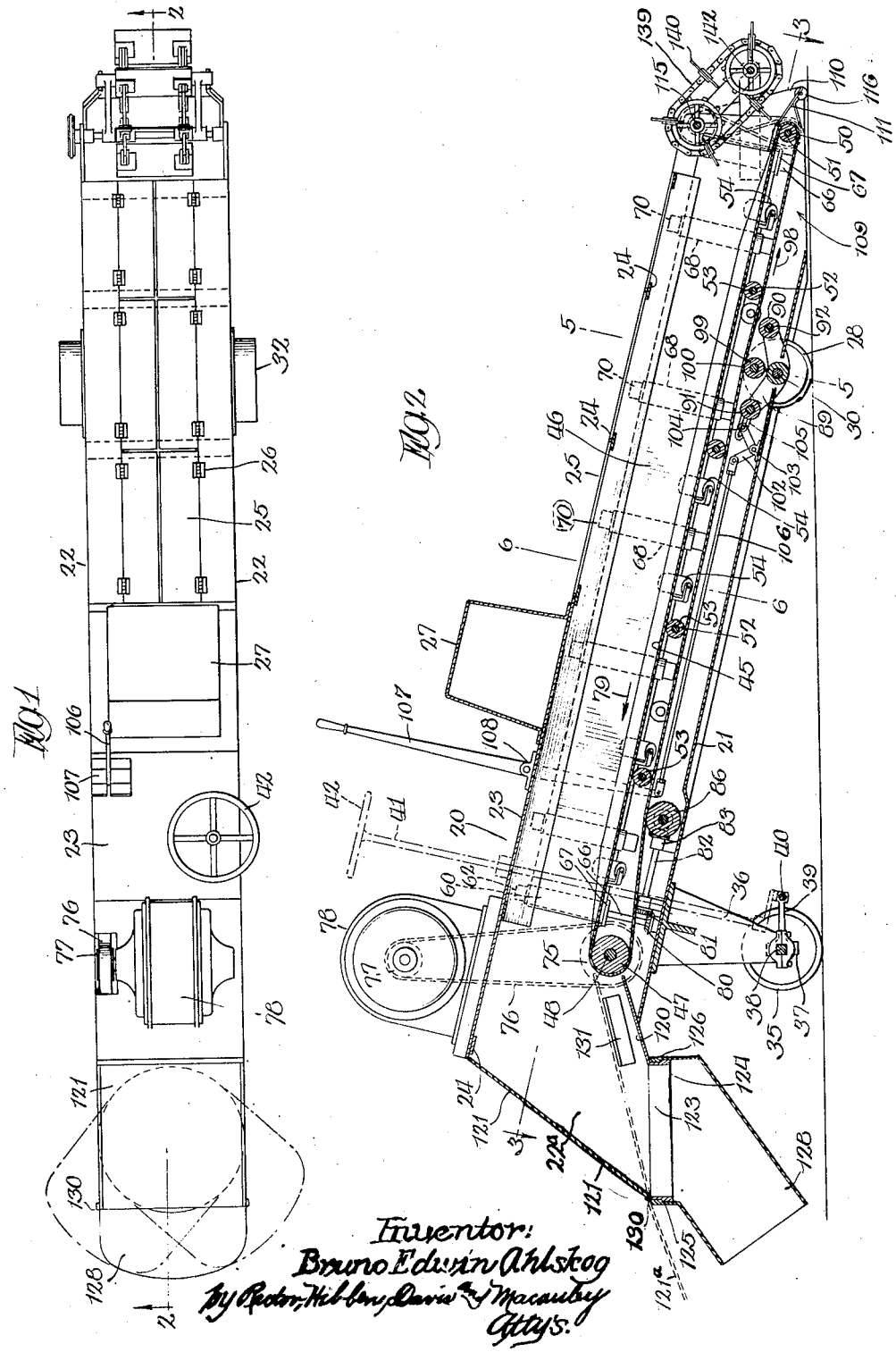
Inventor:
Bruno Edwin Ahlskog Sept. 21, 1926.
B. E. AHLSKOG
1,600,383
GRAIN UNLOADING APPARATUS
Filed March 12, 1923    5 Sheets-Sheet 2
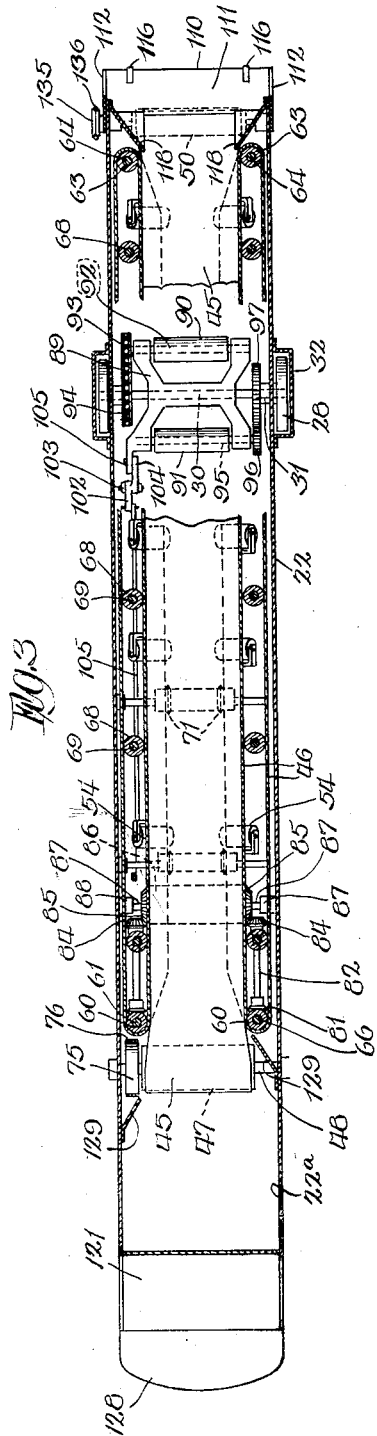
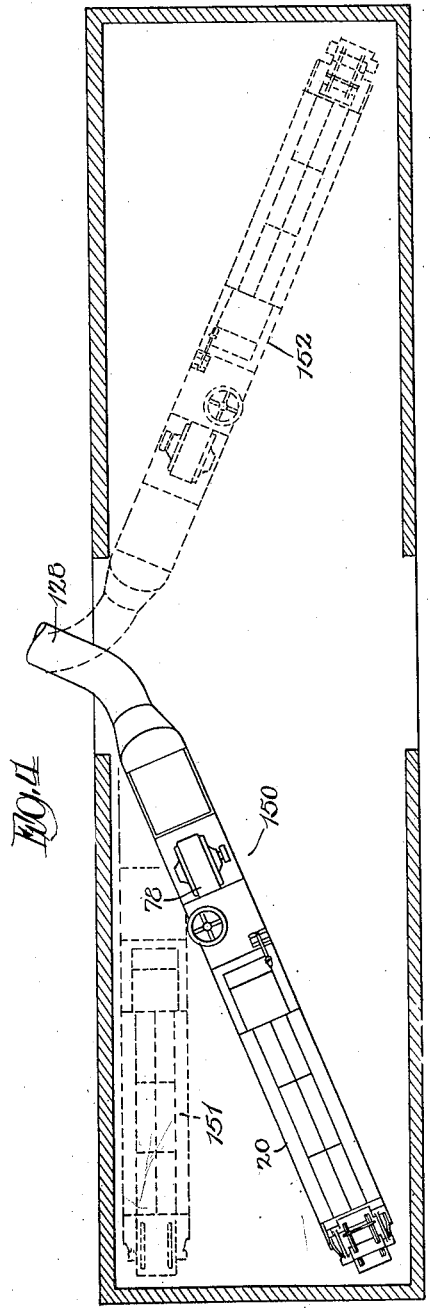
Inventor:
Bruno Edwin Ahlskog
by Rector, Hibben, Davis & Macauley
Attys.

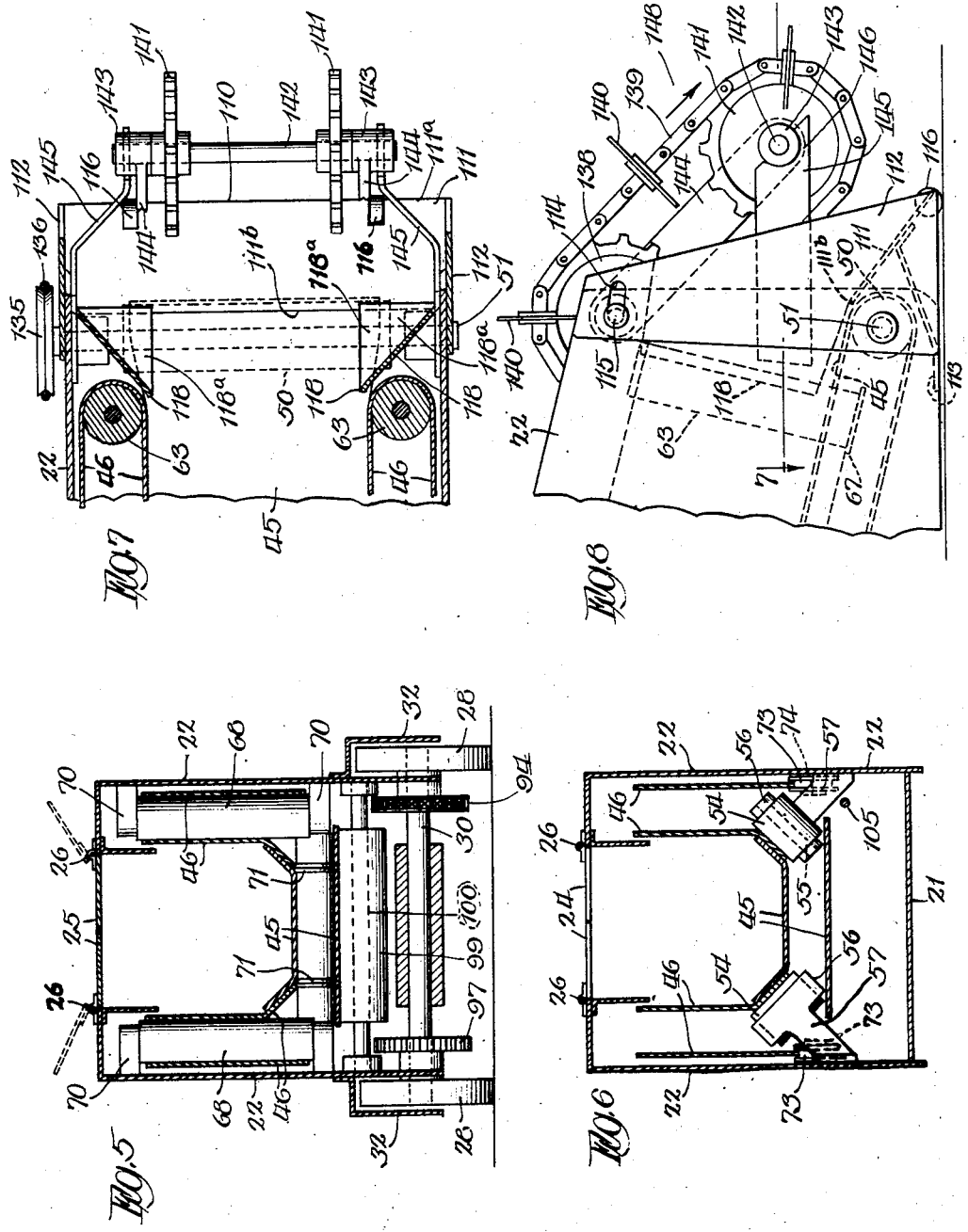

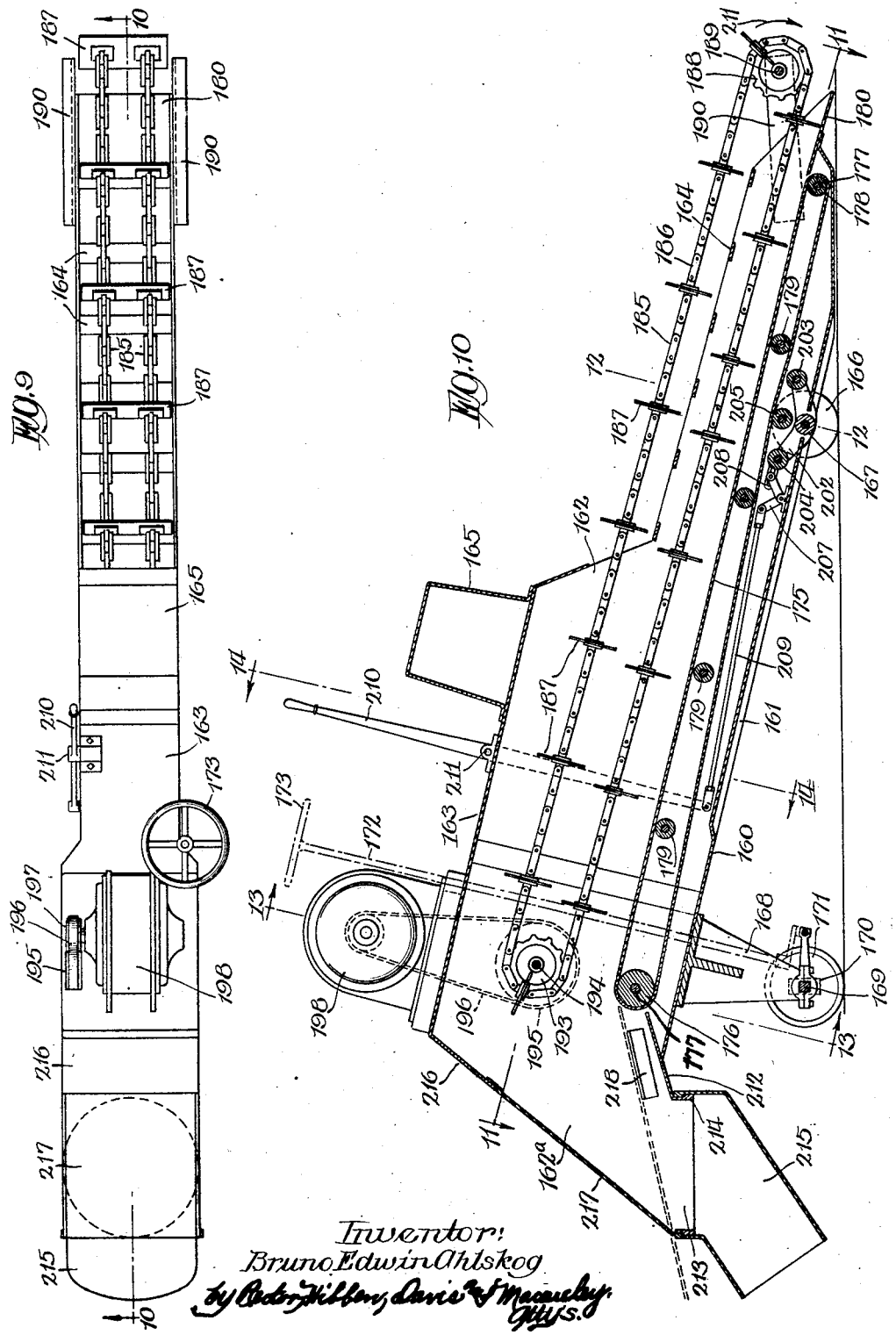

Sept. 21, 1926.
B. E. AHLSKOG
GRAIN UNLOADING APPARATUS
Filed March 12, 1923
1,600,383
5 Sheets-Sheet 5
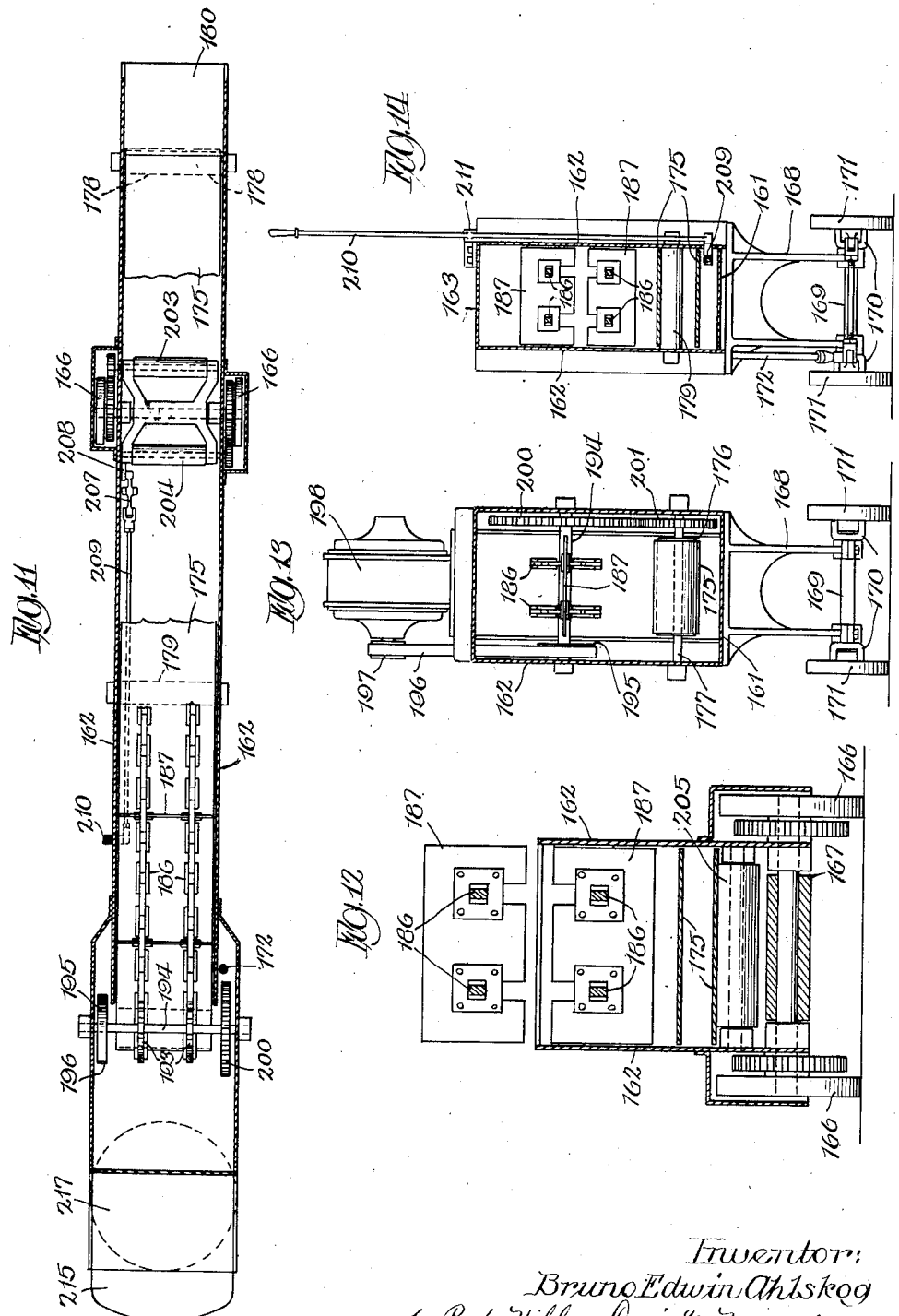
Inventor:
Bruno Edwin Ahlskog
by Rector, Hibben, Davis, and Macauley
Atty's.

Patented Sept. 21, 1926.

1,600,383

UNITED STATES PATENT OFFICE.

BRUNO EDWIN AHLSKOG, OF CHICAGO, ILLINOIS.

GRAIN-UNLOADING APPARATUS.

Application filed March 12, 1923. Serial No. 624,348.

This invention relates to improvements in devices for unloading grain from railway cars and for conveying grain between parts of a grain elevator plant. The purpose of the invention is to provide means whereby the grain may be more quickly, conveniently, and economically handled than has been possible with the methods heretofore employed.

There are two types of apparatus now in use for grain unloading purposes, one of which is the so-called car dumping apparatus which tilts the entire car and spills out the grain through the side door in one operation. A machine of this type will unload the grain very rapidly, but the cost is so great that few grain elevator owners can afford to install it in their plants. The other type of grain unloading apparatus comprises an automatic machine having two scoops which are hauled back into the car manually by the operators and are pulled by the machine alternately to the door opening. The use of this apparatus in unloading a railway car consumes a large amount of time, is very expensive, and is very disagreeable to the workmen because of the heat and dust within the car.

The principal object of this invention is to provide a device which materially increases the speed and reduces the cost of unloading grain from railway cars and which can be manufactured at a cost within the reach of the average grain elevator owner. A further object of the invention is to provide a grain unloading apparatus which can be readily moved to any position within the car to move the grain therefrom outwardly to the door opening. Still another object is to provide a grain conveying device which is relatively narrow in width and which may therefore be readily passed through the car door opening into the end portions of the car. A further important feature of the invention is the provision of an apparatus which automatically picks up the grain and conveys it from all points within the car to and through the car door opening. A further object is to provide a grain conveying apparatus which occupies a comparatively small space and which may therefore be employed to convey grain from one point to another in a grain elevator plant with a capacity to convey the grain as fast as the largest conveyors now used while occupying only a comparatively small space. Other objects of the invention relate to various features of construction and arrangement which appear more fully hereinafter.

The nature of the invention will be understood from the following specification taken with the accompanying drawings in which two embodiments are illustrated. In the drawings, Figure 1 shows a top plan view of the preferred form of the invention; Fig. 2 shows a longitudinal vertical section on the line 2—2 of Fig. 1; Fig. 3 shows a longitudinal section on the line 3—3 of Fig. 2; Fig. 4 shows a horizontal section through a railway car illustrating the use of the apparatus in reaching different parts of the interior of the car; Fig. 5 shows a transverse section on the line 5—5 of Fig. 2; Fig. 6 shows a transverse section on the line 6—6 of Fig. 2; Fig. 7 shows an enlarged section on the line 7—7 of Fig. 8; Fig. 8 shows an enlarged side elevation of the lower end of the grain unloading apparatus; Fig. 9 shows a top plan view of a modified form of the invention; Fig. 10 shows a longitudinal section on the line 10—10 of Fig. 9; Fig. 11 shows a longitudinal section on the line 11—11 of Fig. 10; Fig. 12 shows a transverse section on the line 12—12 of Fig. 10; Fig. 13 shows a transverse section on the line 13—13 of Fig. 10 and Fig. 14 shows a transverse section on the line 14—14 of Fig. 10.

As illustrated in Figs. 1 to 8 inclusive, the invention comprises a longitudinal main frame or housing 20 constructed of sheet metal and adapted to support the various parts of the grain unloading mechanism while at the same time providing an enclosure therefor. This frame or housing comprises a lower wall 21, two parallel side walls 22 extending upwardly therefrom, and an upper wall 23, all these walls being rigidly secured together and reinforced if necessary by other frame members. For example, transverse frame members 24 are provided in contact with the under surface of the top wall 23 and the lower portion of the top wall is provided with a longitudinal opening which is normally closed by a series of doors 25 which are arranged in pairs and secured to the top wall by hinges 26 with their extremities overlapping and resting upon the transverse frame members 24. The top wall 23 also carries a seat 27 adapted to be occupied by the operator of the apparatus, this seat being located above the uppermost pair of doors 25. The machine occupies an inclined position as shown particularly in Fig. 2, being supported at its rear end by a pair of wheels 28 which are mounted on an axle 30 journaled in bearings 31 carried by side walls 22. These wheels are enclosed on their upper and outer sides by casings 32 which are also attached to the side walls, as shown in Fig. 3. At its forward end the machine is supported by a pair of wheels 35 which are disposed on opposite sides of a pair of vertical studs or posts 36 which extend downwardly from the lower wall 21 to which they are rigidly secured. The wheels 35 are mounted on steering knuckles 37 which are mounted to swing about vertical pivots at the ends of the axle 38 which is secured to the lower portions of the posts 36. These steering knuckles are provided with arms 39 which are connected by a transverse rod 40 and a connection is also made from the steering knuckles to the steering posts 41, as in the usual automobile construction. This steering post extends upwardly through bearings carried by the upper and lower walls of the housing 20 and it is provided at its upper end with a steering wheel 42 by which the operator steers the machine as it is propelled in the manner hereinafter described.

The mechanism by which the grain is moved comprises three conveyor belts, including a lower belt 45 and two side belts 46. These belts are endless and may be constructed according to any of the suitable methods now employed in conveyor belt manufacture. The forward portion of the lower belt 45 is passed around a roller 47 which is secured to a shaft 48 journaled in bearings carried by the side walls 22 and the extreme rear portion of the lower belt 45 is passed around another roller 50 secured to its shaft 51 which is also journaled in bearings carried by the side walls. The intermediate portions of the upper stretch of the belt 45 are adapted to be supported on other rollers 52 mounted on the shafts 53 which are similarly journaled in bearings carried by the walls 22. The upper stretch of the belt 45 is troughed by means of inclined rollers 54 which are mounted on the shafts 55 extending between the arms 56 formed on brackets 57 which are secured to the side walls 22, as shown particularly in Fig. 6. The lower portions of the inner stretches of the side belts 46 are deflected inwardly and adapted to underlie the deflected portions of the belt 45 in direct contact with the rollers so that the upper and inner stretches of the belts 45 and 46, respectively, form a comparatively deep and narrow trough in which the grain is adapted to be supported and conveyed.

The side belts 46 are mounted at their forward ends on rollers 60 which are secured to vertical shafts 61 mounted in bearings 62 carried by the upper and lower walls of the housing and the rear ends of these belts are mounted on similar rollers 63 which are secured to shafts 64 journaled at their upper and lower ends in bearings 66 secured to the upper and lower walls of the housing 20. These rollers 60 and 63 are provided at their lower ends with flanges 67 which engage the lower edges of the belts and prevent the downward movement thereof. The intermediate portions of the side belts 46 are adapted to travel in contact with a series of rollers 68 which are mounted on shafts 69 journaled in bearings 70 secured to the walls 21 and 23. Downward sagging or slipping of the inner stretches of the belts 46 is prevented, between the end rollers 60 and 63 by means of the rollers 52 which support the intermediate portion of the upper stretch of the belt 45, these rollers being provided with annular ribs or flanges 71 which engage the edges of the inwardly deflected portions of the belts 46 as shown in Fig. 5. The outer stretches of the side belts 46 are prevented from sagging by means of rollers 73 which are pivotally mounted on brackets 74 secured by the side walls 22 as shown in Fig. 6.

The lower conveying belt 45 is driven through the roller 47 at the forward end thereof, this roller being fixed on the shaft 48 which has a pulley 75 keyed thereon and connected by a belt 76 to the drive pulley 77 mounted on the shaft of an electric motor 78 which is mounted on the upper and forward end of the housing 20. The belt 76 extends downwardly through a slot in the upper wall of the housing, as shown particularly in Fig. 1.

The motor may be connected by flexible cables to a suitable source of supply of electrical energy and the direction of rotation of the motor should be such as to move the upper stretch of the belt 45 in an upward and forward direction as indicated by the arrow 79 in Fig. 2.

The side belts 46, the inner stretches of which are overlapped by the lateral edges of the upper stretch of the belt 45, are adapted to be driven with the same linear speed as the belt 45 through power connections with the shaft 61 upon which the rollers 60 are mounted. These shafts are provided adjacent their lower ends with beveled gears 80 which are secured thereon and adapted to mesh with other beveled gears 81 secured to longitudinal shafts 82 which are journaled in bearings 83 carried by the lower wall 21. The rear ends of the shafts 82 have beveled gears 84 fixed thereon to mesh with other beveled gears 85 which are secured to the ends of a roller 86 mounted on a shaft 87 journaled in bearings 88. The roller 86 is engaged by the lower stretch of the belt 45, as shown particularly in Fig. 2, so that this roller is driven at all times with a speed which is proportional to the speed of the belt 45. The connecting gears are proportioned to move the belts 46 at the same speed as the belt 45 so that the walls of the trough in which the grain is conveyed move upwardly in unison.

In addition to driving the side belts 46, the belt 45 serves as a power transmitting member for propelling the machine on its supporting wheels. This is accomplished through mechanism comprising a rocker-frame 89 which is mounted to pivot on the intermediate portion of the shaft 30 which carries the rear wheels 28. This rocker-frame has oppositely directed pairs of arms between which are mounted two rollers 90 and 91, as shown particularly in Fig. 3. The roller 90 is secured to a shaft 92 which is journaled in the arms of the rocker-frame 89 and provided at one end with a relatively fixed sprocket gear 93 connected by a chain with a sprocket gear 94 secured on the shaft 30. The other roller 91 is similarly mounted on a shaft 95 which is journaled in the arms of the rocker-frame 89 and is provided at one end with a pinion 96 which meshes with a gear 97 secured to the other end of the shaft 30. The lower stretch of the belt 45, which moves rearwardly of the machine, as indicated by the arrow 98, is supported above the shaft 30 by a roller 99 mounted on an idler shaft 100 and either one of the rollers 90 or 91 may be brought into engagement with the lower stretch of the belt 45 by rocking the frame 89 about the shaft 30. When the roller 90 is brought into engagement with the belt 45, the supporting wheels 28 are rotated to propel the machine in a forward direction, that is, toward the left as viewed in Fig. 2 and, when the frame 89 is rocked to bring the roller 91 into engagement with the belt 45, the machine is moved in the opposite direction. This rocking movement of the frame 89 is brought about by a bell crank lever 102 which is pivoted at 103 on the lower wall 21 of the housing, one arm of this bell crank lever carrying a pin 104 which engages a slot in the arm 105 which projects from the frame 89, while the other arm of the lever 102 is pivotally connected to a rod 106 extending longitudinally of the machine and pivotally attached at its forward end to the lower extremity of a lever 107. This lever extends upwardly through a slot in the upper wall 23 of the housing and is pivotally mounted in bearings 108 secured to the upper wall. The projecting portion of the lever is located adjacent the seat 27 so that it can be conveniently manipulated by the operator.

The lower wall 21 of the housing 20 is cut away at the lower end of the machine along with the lower edges of the side walls 22 so that the edges of these walls lie in proximity to the floor of the car, as shown at 109. In order to facilitate the movement of the grain onto the lower conveying belt 45, the housing 20 is provided at its lower end with a relatively narrow chute 110 which comprises a lower inclined wall 111 having one edge 111ª located adjacent the floor of the car and the other edge 111ᵇ overlapping the lower portion of the belt 45, as shown particularly in Figs. 7 and 8. The lower wall 111 serves to unite the side walls 112, and these side walls are also connected by a transverse plate or web 113 which is inclined downwardly from the wall 111 beneath the roller 50 at the rear end of the machine. The shaft 51 upon which the roller 50 is mounted, is projected through the side walls 22 of the housing and the lower parts of the side walls 112 of the chute are pivoted on the projecting ends of the shaft. The upper parts of the side walls 112 of the shaft are provided with slots 114 adapted to be engaged by the ends of a shaft 115 which is journaled in bearings carried by the side walls 22 of the housing. This method of mounting the chute 110 permits it to rock slightly with respect to the housing 20 in order to accommodate itself to irregularities in the floor of the car, such as pieces of board which may be nailed over holes in the floor. The passage of the chute over such irregularities is facilitated by the provision of small rollers 116 which are mounted in brackets carried by the underside of the plate 111 and located in slots formed in the plate, as shown particularly in Fig. 7. The chute thus operates to direct the grain into the housing and onto the lower end of the conveying belt 45 as the machine is advanced into the car. The grain is deflected inwardly between the side conveying belts 46 by means of inclined plates 118 which are secured to the side walls 112 of the chute and project inwardly therefrom. The lower ends of these deflecting plates are preferably curved inwardly to join the upper edge 111ᵇ of the plate 111, as shown at 118ª, in order to prevent the escape of any grain downwardly at the edges of the lower portion of the belt 45. The grain which falls by gravity from the pile of grain within the car piles up on the lower end of the conveying belt 45 and may substantially fill the channel between the side conveying belts 46 so that a comparatively narrow column of grain of considerable depth is conveyed upwardly by the belts which move in unison. At the upper end of the machine, the grain is discharged from the belt 45 onto an inclined plate 120 which extends between the parts 22ª of the side walls of the housing. An end wall 121 extends between the wall sections 22ª thus forming a chute through which the grain is discharged by gravity. This chute has a circular discharge opening 123 formed by a depending flange 124 and this flange is provided with a bearing 125 which supports the annular flange 126 formed on the upper end of an inclined conveyor tube 128. This tube may be turned on its bearing in order to direct the grain in any desired direction so that it may be discharged through the door opening of the car in any position of the machine within the car. In order to prevent the escape of grain adjacent the upper part of the lower conveying belt 45, beyond the upper portions of the side belts 46, deflecting plates 129 are secured to the side wall portions 22ª and inclined inwardly with their edges located adjacent the roller 60 about which the belts 46 pass. It may be desirable in some instances to dispense with the use of the conveyor tube 128 and for that purpose the end wall 121 is hinged at its lower edge as shown at 130 and adapted to swing downwardly between the side walls 22ª until it occupies the position shown by dotted lines with its edges resting on the angle bars 131 which are secured to the side walls. The upper edge of the wall 121 then lies in proximity to the roller 47 so that the grain is received thereon directly from the lower conveying belt. The end wall 121 may be made up of two hinged plates which normally lie parallel to each other so that when one plate has swung inwardly to receive the grain from the belts, the other plate may be swung outwardly to assume the position shown at 121ª thereby forming a continuation of the inwardly directed plate and being adapted to convey the grain outwardly to the place where it is to be discharged.

Although the apparatus as above described is adapted to effect an efficient discharge of the grain from the car, auxiliary apparatus may be employed for moving the grain into the lower end of the housing 20 and onto the conveyer belts. This auxiliary apparatus is carried by the shaft 115, previously referred to, which is mounted at the lower ends of the side walls 22. This shaft has a grooved pulley 135 fixed on the projecting end thereof and it is driven by a rope belt 136 which passes around this pulley and around a similar pulley mounted on the end of the shaft 51. Two sprocket gears 138 are fixed on the shaft 115 between the side walls 22 and these sprocket gears carry sprocket chains 139 which are provided with transverse grain pushing blades 140. The chains 139 are passed around other sprocket gears 141 which are fixed on the shaft 142 journaled in bearings 143 carried at the ends of arms 144 which are secured to the side walls 22 and which are pivoted at their other extremities on the shaft 115 so that these arms and the shaft 142 are free to swing upwardly and carry the chains 139 with them. The downward swinging of the shaft 142 is limited by a pair of struts 145 which are secured to the side walls 22 and extend outwardly therefrom with recesses 146 in their extremities adapted to engage the bearings 143. As the machine is moved into the pile of grain, the chains 139, being driven in the direction indicated by the arrow 148 in Fig. 8, engage the grain through the blades 140 and drag it downwardly toward the inlet of the housing 20. The pivotal mounting of the arms 144 permits the grain moving device to assume an inclination corresponding to the inclination of the grain pile so that, regardless of the amount or arrangement of the grain in proximity to the lower end of the housing 20, the blades 140 are adapted to scrape the grain downwardly toward the conveyor belt 45.

The machine as heretofore described is self propelling within the range of the flexible cables connected to the drive motor 78 and it may be moved into the railway car from a platform along-side of the track which is located at the level of the car floor. Owing to the comparatively narrow width of the usual car door opening and the correspondingly limited width of the space within the car, a machine of sufficient length to be effective in discharging the grain through the car door opening must be comparatively narrow while at the same time having the capacity for moving the grain rapidly. These requirements are met very effectively in the present invention where the construction and arrangement of the conveyor belts permit a large volume of grain to be moved in a unit of time while at the same time allowing the width of the machine to be restricted to very narrow limits. For example, a machine having a total outside width of twenty-one (21) inches and a total length of eighteen (18) feet may be passed through the usual car door opening and caused to assume various positions for picking up and conveying grain from any point within the interior of the usual railway car. Substantially all of the mechanism of the machine is contained within the housing which is uniform in width throughout so that there are no projections to engage the door posts or other objects within the car. The arrangement of the machine is illustrated in Fig. 4 where the machine is shown by full lines at 150 occupying an inclined position longitudinally of the car and adapted to discharge grain through the door opening. By suitably turning the discharge tube or spout 128, the machine may be caused to assume a position along side of the side wall of the car as shown at 151 or it may be reversed and directed toward the other end of the car as shown at 152. All of these movements of the machine are brought about by the operator who occupies the seat 127 and manipulates the steering wheel 42 and the power lever 106 to bring about the desired movement of the machine. At the beginning of the unloading operation, only the lower end of the machine is within the car and as the grain is rapidly discharged by the conveying belts, the operator advances the machine into the car and gradually changes its position until all of the grain has been discharged. By the use of this invention the entire contents of the car can be discharged in a very limited space of time and without leaving a large residue on the car floor, so that the final sweeping operation is comparatively simple as compared with other methods of discharging grain heretofore used.

A modified and somewhat more simple form of construction of the invention is illustrated in Figs. 9 to 14 inclusive, this form differing chiefly from the preferred form in that the side conveying belts are dispensed with and another form of grain moving mechanism substituted. In this second form, the mechanism is carried by a main frame or housing 160 comprising a lower wall 161, side walls 162, and the top wall 163, all of which are rigidly secured together and reinforced by suitable frame members. The side walls 162 are decreased in height toward the lower end of the machine and the top wall 163 is discontinued over this portion of the housing where the side walls are connected by transverse frame members 164. A seat 165 is mounted on the top wall 163 adjacent the point where the side walls are decreased in height. The frame or housing is supported adjacent its lower end by wheels 166 which are fixed on an axle 167 mounted in bearings carried by the side walls 162 and, at the forward end of the machine, the frame is supported by a pair of fixed posts 168 which extend downwardly and are connected at their lower ends to the axle 169. This axle is pivotally connected at its ends to steering knuckles 170 which carry the bearings of the wheels 171. The steering knuckles are connected in the manner of the usual automobile construction and are operated by the steering post 172 having a steering wheel 173 mounted on the upper end thereof.

In this form of the invention, the grain is conveyed by an endless belt 175 which is mounted at its forward end on a roller 176 fixed on a shaft 177 which is journaled in bearings carried by the side walls 162. At the lower end of the machine, the belt 175 is mounted on a roller 177 which is fixed on a shaft 178 journaled in bearings carried by the side walls of the frame. The intermediate portions of the conveyor belt are mounted on idler rollers 179 whch are carried by shafts similarly journaled in bearings carried by the side frame members. The conveyor belt extends continuously between the side walls of the frame and is the principal element in conveying the grain which is passed onto the lower end thereof over the inclined plate 180 which has one edge located in proximity to the floor of the car and the other edge overlapping the lower part of the belt.

As a further means of propelling the grain through the housing, there is provided a feeding chain 185 which comprises two separate endless sprocket chains 186 connected by transverse scrapers or blades 187 which project above and below the stretches of the chain. At the lower end of the machine the chains 186 are mounted on sprocket gears 188 which are fixed on the shaft 189 journaled in bearings carried by arms 190 which project longitudinally from the side frames 162. At the forward end of the machine, the sprocket chains 186 are mounted on other sprocket gears 193 which are fixed on a shaft 194 journaled in bearings carried by the side frame members and carrying a relatively fixed pulley 195 which is driven by a belt 196 leading from the pulley 197 on the shaft of an electric motor 198. The motor is mounted on the upper wall 163 of the housing and the belt 196 extends downwardly through a slot in this wall so that the parts of the motor and the connected mechanism do not extend beyond the lateral edges of the frame which is widened at this point in comparison with the width of the lower part thereof. It will be observed that in this form of the invention, the absence of the side conveying belts makes it possible to reduce materially the width of the machine throughout a substantial portion of its length.

The end of the shaft 194 opposite the pulley 195 has a gear 200 fixed thereon and arranged to mesh with another gear 201 fixed on the shaft 177 of the roller 176, as shown particularly in Fig. 13, so that the conveyor belt 175 is also driven from the motor 198 with a speed corresponding to the speed of the conveyor chain 185. The conveyor belt 175 is utilized to propel the machine on its supporting wheels in the same manner as that described in connection with the preferred embodiment of the invention, the construction comprising a rocker-frame 202 pivotally mounted on the shaft 167 of the rear wheels 166 and having mounted thereon two rollers 203 and 204, either of which may be brought into engagement with the lower stretch of the belt 175 which is supported immediately above the shaft 167 by means of a roller 205. The shaft of the roller 203 is connected through sprocket gears and a chain with one end of the shaft 167 and the shaft of the roller 204 is connected through meshing gears with the other end of the shaft 167, and the rocker-frame 202 is adapted to be oscillated through a bell-crank lever 207 pivoted on the lower wall of the frame and having one arm connected to the sloted projection 208 carried by the rocker-frame while the other arm thereof is connected through a rod 209 with the operating lever 210 pivotally mounted at 211 on the upper wall 163 of the housing.

In the form of the invention last described the machine is propelled on its wheels into the pile of grain in the car whereupon the grain flows by gravity into the lower part of the housing which is open on its upper side between the frame members 164 so that the grain may be received not only at the extreme lower end of the housing but throughout a substantial portion of its length. The upper stretch of the conveyor chain 185 travels above the transverse frame members 164 and the extreme lower portion of the conveyor chain projects beyond the lower edge of the inclined plate 180 so that as the blades 187 travel around in the direction indicated by the arrow 211, they tend to scrape the grain into the chute and onto the conveyor belt. As the movement of these blades is continued through the housing, they supplement the action of the conveyor belt in moving the grain toward the upper end of the housing where it is discharged onto the inclined plate 212 extending between the extensions 162ª of the side walls. The discharge chute thus formed is provided with a circular opening 213 formed by an annular flange 214 which is provided with a bearing to support the upper end of the discharge spout or tube 215 by which the grain is conveyed to storage bins or to other conveying or transporting apparatus. The front wall 216 of the housing may be provided with a hinged portion 217, as in the previous form of the invention, this hinged portion being capable of being dropped inwardly to rest on the angle bars 218 with its upper edge terminating adjacent the upper portion of the conveyor belt 175.

In either form of the invention a large volume of grain can be transported through a housing which is comparatively narrow so that the machine may be conveniently manipulated in passing it through the car door opening into the interior of the car. Although the devices employed in these machines for conveying the grain are of particular advantage in the machines for unloading grain from railway cars, the conveying mechanisms may be employed in other parts of a grain elevator plant for effecting a rapid movement of large volumes of grain through the spaces which are comparatively narrow.

Although two forms of the machine have been shown and described for purposes of illustration, it will be understood that the invention may be constructed in various other embodiments without departing from the scope of the appended claims.

I claim:

1. The combination in grain moving apparatus of a frame, an endless belt movable longitudinally of said frame and having the lateral edges of its upper stretch deflected upwardly, and a pair of endless side belts extending upwardly at the sides of said first-named belt to form a grain conveying trough.

2. The combination in grain moving apparatus of a frame, an endless belt movable longitudinally of said frame, and a pair of side belts extending upwardly at the sides of said first-named belt to form a grain conveying trough, said side belts being endless and having their lower edges deflected inwardly along the inner stretches thereof.

3. The combination in grain moving apparatus of a frame, an endless belt, movable longitudinally of said frame and having the lateral edges of its upper stretch deflected upwardly, and a pair of side belts extending upwardly at the sides of said first named belt, and having the lower edges of their inner stretches deflected inwardly to contact with the deflected portions of said first named belt.

4. The combination in grain moving apparatus of a frame, an endless belt, movable longitudinally of said frame and having the lateral edges of its upper stretch deflected upwardly, and a pair of side belts extending upwardly at the sides of said first named belt and having the lower edges of their inner stretches deflected inwardly to contact with the deflected portions of said first named belt, said belts being inclined upwardly in the direction of movement of their upper and inner stretches.

5. The combination in grain moving apparatus of a frame, an endless belt movable longitudinally of said frame and having the lateral edges of its upper stretch deflected upwardly, and a pair of side belts extending upwardly at the sides of said first named belt, and having the lower edges of their inner stretches deflected inwardly to contact with the deflected portions of said first named belt, rollers for supporting and deflecting said belts, and means for mounting said belts on said rollers.

6. The combination in grain conveying apparatus, of a supporting frame, an endless conveyor belt mounted on said frame, means for supporting and driving said conveyor belt, driving wheels for supporting said frame, a rocker-frame mounted adjacent said driving wheels, a roller mounted on said rocker-frame and geared to said wheels, and means for tilting said rocker-frame to move said roller into engagement with said conveyor belt.

7. The combination in grain moving apparatus of a frame, an endless conveyor belt, means for supporting said conveyor belt, means for driving said conveyor belt, an axle journaled in said frame, supporting wheels mounted on said axle, a rocker-frame mounted on said axle, a pair of rollers mounted on said rocker-frame on opposite sides of said axle, means for independently connecting said rollers to drive said axle, and means for tilting said rocker-frame to move either of said rollers into engagement with said conveyor belt.

8. The combination in grain moving apparatus of a frame, an endless belt inclined longitudinally of said frame and adapted to convey grain on the upper surface thereof, side belts extending upwardly on opposite sides of said first named belt, rollers mounted on horizontal axes for supporting said first named belt, other rollers mounted in vertical planes for supporting said side belts, and additional rollers mounted in inclined position for deflecting the adjacent edges of said first named belt and said side belts.

BRUNO EDWIN AHLSKOG.